United States Patent
Muraki et al.

(10) Patent No.: US 6,954,338 B2
(45) Date of Patent: Oct. 11, 2005

(54) SYSTEM AND METHOD OF LIMITING A RANGE OF MOTION OF AN ACTUATOR IN A HARD DISK DRIVE

(75) Inventors: Takuma Muraki, Yamato (JP); Kohichi Takeuchi, Yamato (JP); Shingo Tsuda, Yokohama (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 63 days.

(21) Appl. No.: 10/288,054

(22) Filed: Nov. 5, 2002

(65) Prior Publication Data

US 2003/0090841 A1 May 15, 2003

(30) Foreign Application Priority Data

Nov. 9, 2001 (JP) .................................. 2001-344497

(51) Int. Cl.⁷ .................................................. G11B 5/54
(52) U.S. Cl. .................................................. 360/265.1
(58) Field of Search ........................ 360/256.2, 265.1

(56) References Cited

U.S. PATENT DOCUMENTS

| | | | | |
|---|---|---|---|---|
| 4,439,792 A | * | 3/1984 | van de Bult | 360/265.1 |
| 5,875,073 A | * | 2/1999 | Andrews et al. | 360/265.1 |
| 6,535,358 B1 | * | 3/2003 | Hauert et al. | 360/256.2 |
| 6,735,053 B2 | | 5/2004 | Miyamoto et al. | |
| 2003/0081354 A1 | * | 5/2003 | Ooi et al. | 360/256.2 |
| 2003/0206377 A1 | * | 11/2003 | Ong et al. | 360/256.2 |

FOREIGN PATENT DOCUMENTS

| | | |
|---|---|---|
| JP | S63-000865 | 1/1988 |
| JP | H2-117771 | 5/1990 |
| JP | H10-269725 | 10/1998 |
| JP | 2000-98183 | 4/2000 |

\* cited by examiner

*Primary Examiner*—Angel Castro
(74) *Attorney, Agent, or Firm*—Bracewell & Giuliani LLP

(57) ABSTRACT

A disk drive unit such as a hard disk drive is provided in which the efficiency of manufacturing processes, cost reductions, and space savings are achieved. The hard disk drive has a stopper that is arranged between a set of coil holding arms of an actuator. The stopper regulates inward and outward turning of the actuator. A magnet is embedded in the stopper and holds a magnetic head of the actuator on a ramp.

7 Claims, 8 Drawing Sheets

(a)
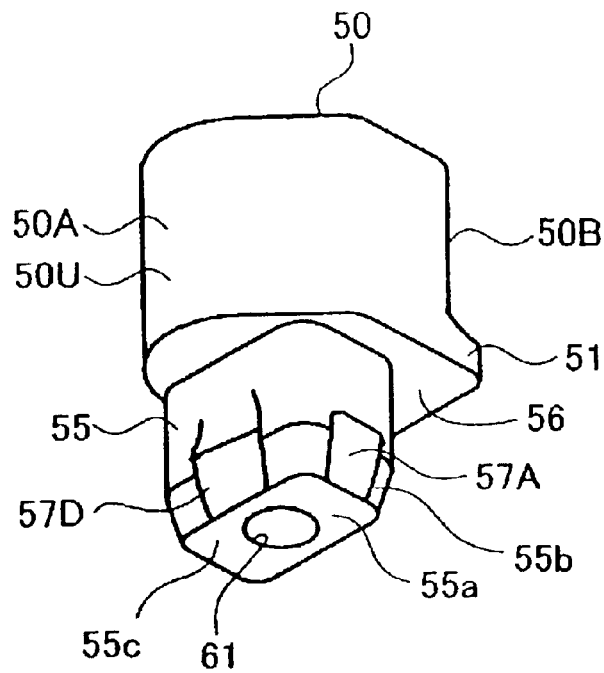
(b)
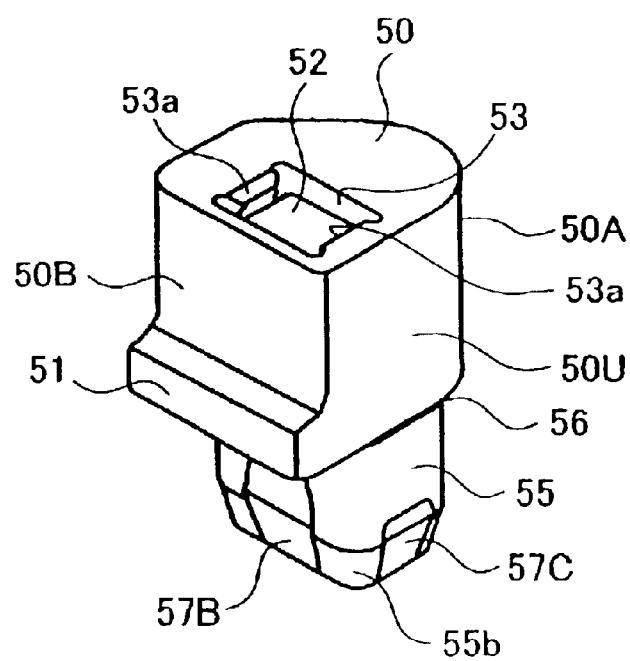
Fig. 6

SYSTEM AND METHOD OF LIMITING A RANGE OF MOTION OF AN ACTUATOR IN A HARD DISK DRIVE

This application claims the priority of Japanese Patent No. JP2001-344497 filed on Nov. 9, 2001, and entitled "Disk Drive Unit, Hard Disk Drive, Head Driving Unit, and Stopper".

BACKGROUND OF THE INVENTION

1. Technical Field

The present invention relates in general to a disk drive unit and, in particular, to an improved system and method for limiting a range of motion of an actuator in a hard disk drive.

2. Description of the Related Art

It is commonly known that a hard disk drive is widely used as a storage means for data in a computer system. FIG. 8 depicts an exemplary structure of a hard disk drive. For a hard disk drive 1 shown in FIG. 8, a disk enclosure is comprised of a box-type base 2 with its ceiling open and a cover (not shown) for closing this opening of base 2. In the disk enclosure are provided a predetermined number of magnetic disks 4 that are supported by a spindle motor 3 of a hub-in structure, wherein magnetic disks 4 are rotated by spindle motor 3 at a predetermined speed.

In base 2, there is provided an actuator 5. Actuator 5 is rotatably attached in its mid-section to base 2 via a pivot 6. At the front end of actuator 5 is provided a magnetic head 7 for reading and writing data to magnetic disk 4. At the back end of actuator 5 is provided a voice coil 8. On the other hand, there is also provided in base 2 a stator 9 placed opposite the voice coil 8, wherein voice coil 8 and stator 9 cooperates each other and compose a voice coil motor. The voice coil motor turns actuator 5 on pivot 6 by utilizing the magnetic force which is induced between voice coil 8 and stator 9 by supplying electric current to voice coil 8.

There are prior art stoppers 10, 11 attached to base 2 which regulate a turning range of actuator 5 toward the inside and outside of magnetic disk 4, respectively. Stopper 10, which regulates the turning of actuator 5 toward the inside of magnetic disk 4, has a function for preventing actuator 5 from coming in contact with a top clamp 12 which secures magnetic disk 4 to spindle motor 3 and a function for securing a predetermined positioning accuracy of actuator 5 when writing servo information to magnetic disk 4. On the other hand, stopper 11, which regulates the turning of actuator 5 toward the outside of magnetic disk 4, has a function, particularly in the case of the load/unload type of disk drive that has been widely used recently, for preventing actuator 5 from passing through a ramp 13 which serves to hold magnetic head 7 in its evacuated condition. Furthermore, stopper 11 has a built-in magnet to keep magnetic head 7 stationary on ramp 13, whereby actuator 5 is pulled to stopper 11 by means of the magnetic force.

Conventionally, such a stopper 11 is secured to base 2 by inserting a pin provided on stopper 11 into a mounting hole formed in base 2 or by inserting a boss formed on base 2 into a hole formed in stopper 11. The stopper 10, which serves to regulate actuator 5 turning toward the inside of magnetic disk 4, must be attached to base 2 with high precision. This is because a reference position for writing be in a condition where actuator 5 is up against stopper 10 when servo information is written to magnetic disk 4 using magnetic head 7. Along with the tendency in magnetic disk 4 toward high recording densities, more precise positioning accuracy is now required. For this reason, the attachment accuracy of stopper 10 to base 2 needs be enhanced. Therefore, it is commonly the case that clamp faces or bosses have been formed on base 2 by means of cutting operations.

3. Problems to be Solved by the Invention

The prior art designs prevent the efficiency of manufacturing processes and cost reductions of hard disk drives to perform additional processing of base 2 which is typically cast, in order to form clamp faces or bosses for stopper 10. Moreover, it is problematic to attach two stoppers 10, 11 to base 2, which reduces the efficiency of manufacturing processes, as well. In addition, as downsizing of hard disk drives has rapidly progressed in recent years, it may be difficult to keep space for attachment of stoppers 10, 11 particularly in small-sized hard disk drives.

In view of the above problems, it may be conceivable to integrate two stoppers 10, 11 by linking them together, however, this can not solve all of the problems and consequently there sill remain some problems, such as space limitations and the need of additional processes for ensuring attachment accuracy of those stoppers to base 2.

The present invention is directed to solve those technical problems mentioned above. Therefore, it is an object of the present invention to provide a disk drive unit, a hard disk drive or the like, in which the efficiency of manufacturing processes, cost reductions, and space savings are achieved.

BRIEF DESCRIPTION OF THE DRAWINGS

FIG. 5(a) is a plan view where an actuator is located on the inside of the turning range, while FIG. 5(b) is a plan view where the actuator is located on the outside of the turning range.

FIG. 6(a) is a perspective view of a stopper when looking up from an angle below, while FIG. 6(b) is a perspective view of the stopper when looking down from an angle above.

SUMMARY OF THE INVENTION

Figure 1:
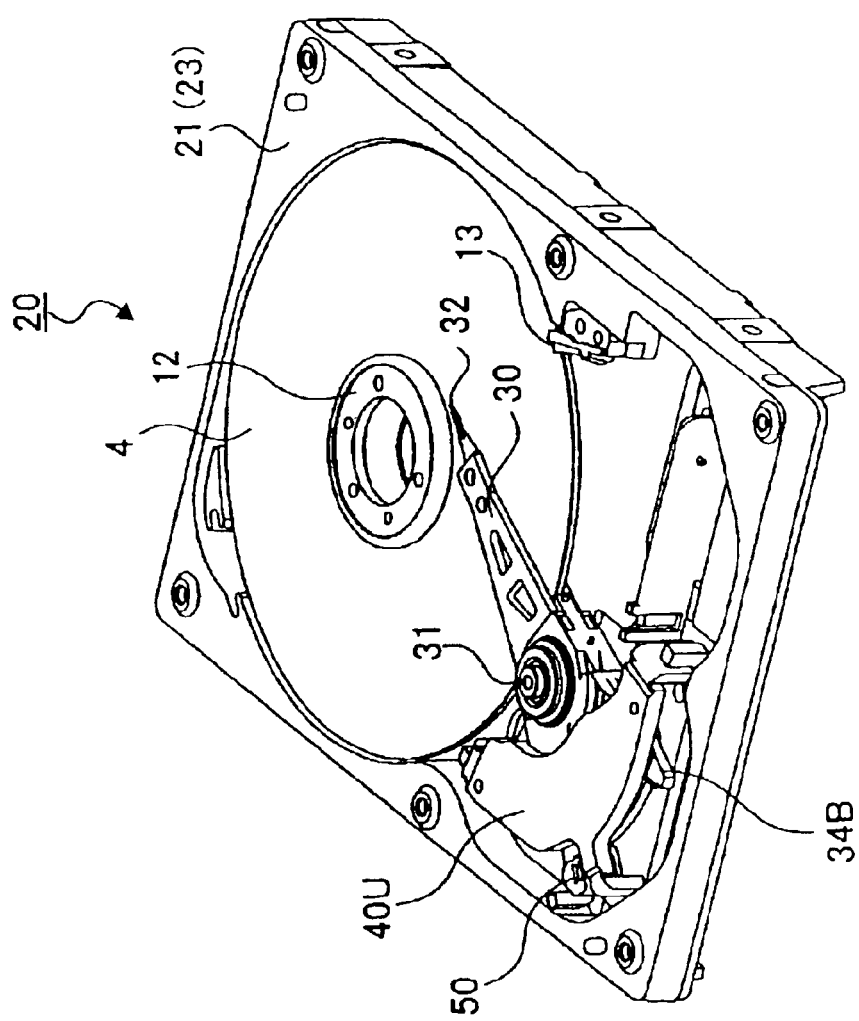
FIG. 1 is a perspective view of a hard disk drive according to the embodiment of the invention.

One embodiment of a disk drive unit of the present invention has an actuator on which a head is mounted for reading and writing data to a disk-like medium, and is provided with a pair of receiving features, which protrude from a pivotal axis toward an outer circumference and are located on the same circumference, wherein a stopper secured to a chassis is provided between the pair of receiving features. When the actuator turns around, the pair of receiving features bump into the stopper and the turning of the actuator is regulated. More specifically, the stopper bumps into one of the receiving features to regulate one side of the turning range of the actuator, while bumping into the other receiving feature to regulate the other side of the turning range of the actuator.

Alternatively, a fixing member for securing the actuator when one of the receiving features bumps into the stopper may be provided integral with the stopper. This allows a head to remain on the ramp in the case of so-called load/unload type of disk drive unit, which is equipped with a ramp for holding the head when it evacuates outside of the disk-like medium. With such a configuration, the actuator can be secured on one side of the turning range of the actuator even for a load/unload type of disk drive unit.

It should be noted that such disk drives may be either a hard disk drive or other kinds of disk drive units as long as the actuator turns around over the disk-like medium. Furthermore, the disk-like medium is not limited to a magnetic disk, however, an optical disk and other kinds of recording disks are contained in the scope of the present invention.

A hard disk drive of the present invention comprises: an actuator for seeking a magnetic head over a disk-like medium by being turned on a pivot; and a stopper provided in a turning range of the actuator and having a combination of functions for regulating a seek range of the magnetic head on the inside of the disk-like medium and for regulating a seek range on the outside of the disk-like medium. Namely, the stopper has as least two functions.

For this purpose, the stopper is desirably provided as an integral part with an inside regulation feature for regulating the magnetic head turning inside of the disk-like medium and an outside regulation feature for regulating the magnetic head turning outside of the disk-like medium.

Furthermore, the actuator preferably has a pair of receiving features formed, wherein the receiving features bump into the stopper to regulate the turning of the actuator. More specifically, in order to provide such a stopper in the tuning range of the actuator, it is preferred to form a pair of receiving features on a pair of arms in which a voice coil of the voice coil motor is held by the actuator.

When the hard disk drive has a ramp for holding the magnetic head when it evacuates outside of the magnetic head, the stopper preferably has a magnet for securing the actuator, with the magnetic head being held on the ramp. This allows the actuator to have a total of three functions including the above two functions.

In another aspect of the present invention, there is provided a head driving unit, comprising: a head for reading and writing data to a disk-like medium; an actuator for seeking the head over the disk-like medium; and a voice coil motor for turning the actuator on a pivotal axis. For this head driving unit, there is provided a stopper for regulating the turning range of the actuator when seeking the head, and further provided on the actuator a pair of arms for supporting the voice coil, wherein the stopper is provided to be arranged between the pair of arms of the actuator. Such a head driving unit is applicable to a disk drive unit with a built-in disk-like medium, such as a hard disk drive, however, it is also applicable to a disk drive unit with a detachable disk-like medium.

The stopper comprises a fixing feature secured to the stator composing a voice coil motor, and contact features which the arms come in contact with in the end of the turning range when the actuator turns. The stopper according to such a structure can be secured to the stator by inserting the fixing feature in a hole formed in the stator. This eliminates the need for securing the stopper to the chassis of the disk drive unit. Particularly, an additional process for securing the stopper is no longer required if the hole is formed at the same time when the stator is formed by press working.

The stopper may be provided with an absorption member, such as a magnet, for absorbing the one arm. In this case, it is desirable that the absorption member is arranged closer to the one contact feature, which the one arm comes in contact with, than the other contact feature, which the other arm comes in contact with, in order to exert absorptivity effectively to the one arm.

In a further aspect of the present invention, there is provided a stopper for regulating a turning range of an actuator that seeks a head over a disk-like medium composing a disk drive unit. The stopper comprises as an integral part: a columnar stopper portion comprising a contact feature that comes in contact with the actuator when the actuator reaches one end of the turning range, and a contact feature that comes in contact with the actuator when the actuator reaches the other end of the turning range; a fixing feature extending along an axis of the stopper portion for securing the stopper portion to the disk drive unit; and a magnet for absorbing the actuator when the actuator reaches the one end of the turning range and comes in contact with the stopper portion. The stopper is attached to the disk drive unit by inserting the fixing feature in a hole formed in the disk drive unit. In this case, it is desirable that a feature protruding laterally is provided for preventing the stopper from -falling out of the hole.

Furthermore, if a taper that becomes gradually narrow toward its end is formed in the fixing feature, it becomes easy to insert the fixing feature into the hole. Moreover, if there is provided at the end of the fixing feature a concave recess that is formed along the axis of the fixing feature, insertion of the fixing feature into the hole in the disk drive unit is easily performed even if the feature for preventing the stopper from falling out is provided because transformation inside the concave recess is allowed.

DETAILED DESCRIPTION OF THE INVENTION

Figure 8:
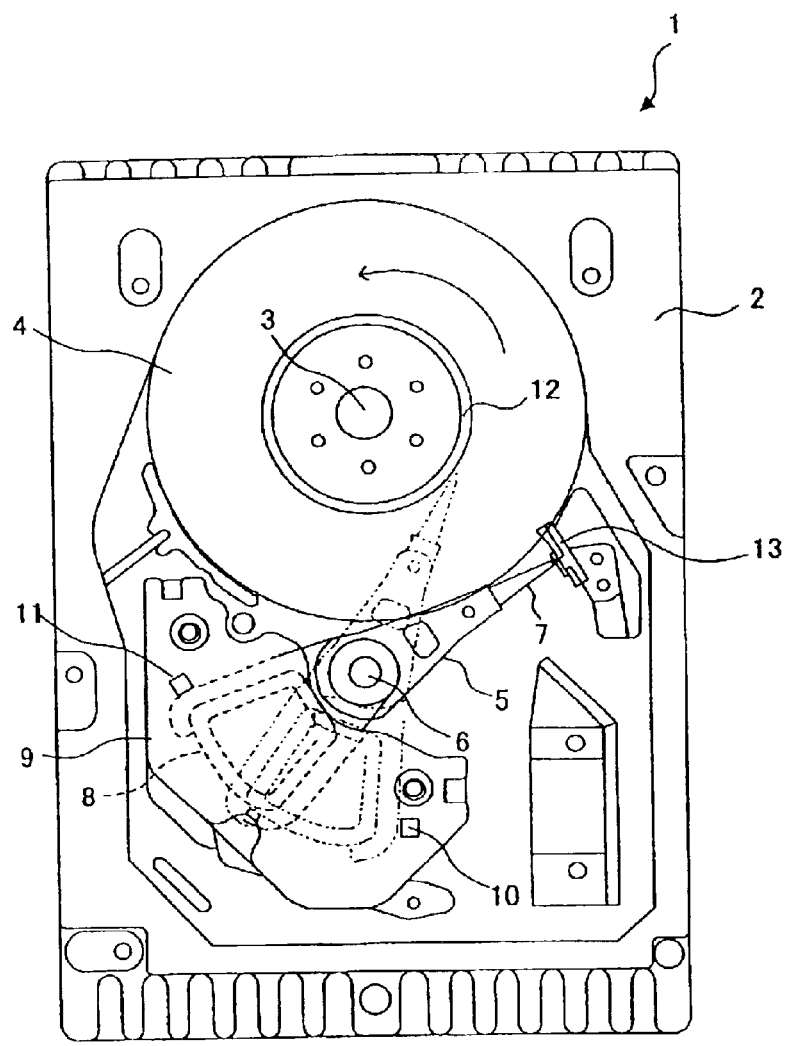
FIG. 8 depicts an exemplary structure of a conventional hard disk drive.

FIG. 1 is a diagram illustrating a hard disk drive (disk drive unit) 20 according to one embodiment of the invention. In the following description, the common components to those of hard disk drive 1 shown in FIG. 8 are shown by the same reference numbers and explanation thereof will be omitted.

Figure 2:
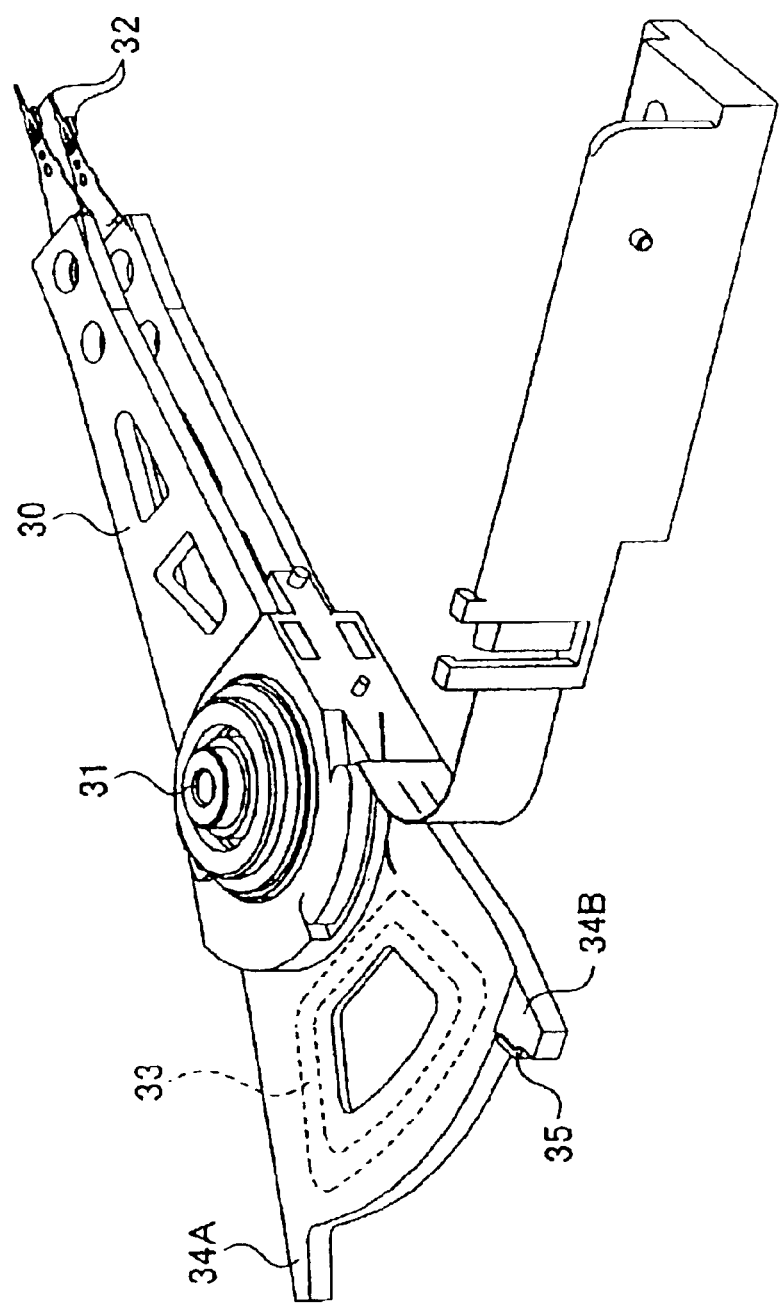
FIG. 2 is a perspective view of an actuator.

As shown in FIG. 1, for a hard disk drive 20 of this embodiment, a disk enclosure (chassis) 23 comprises a box-type base 21 with its ceiling open and a cover (not shown) for closing this opening of base 21. As shown in FIG. 2, in the disk enclosure 23 are provided a predetermined number of magnetic disks 4, which are supported by a spindle motor (i.e., disk driving source) (not shown) of a hub-in structure mounted on base 21 and secured by a top clamp 12. These magnetic disks 4 are rotated by the spindle motor at a predetermined speed. There is also provided in disk enclosure 23 an actuator 30. Actuator 30 is rotatably attached in its midsection to base 21 via a pivot (pivotal axis) 31.

As shown in FIG. 2, at the front end of actuator 30 is provided a magnetic head 32 for reading and writing data to magnetic disk 4. At the back end of actuator 30 is provided a voice coil 33. Voice coil 33 is arranged between a pair of V-shaped coil holding arms (receiving features) 34A and 34B, which extend radially from pivot 31. In this embodiment, coil holding arms 34A and 34B are made of PPS (polyphenylene sulfide resins, i.e., thermoplastic engineering plastic), for example, and further these coil holding arms 34A, 34B and voice coil 33 are integrally overmolded.

Figure 3:
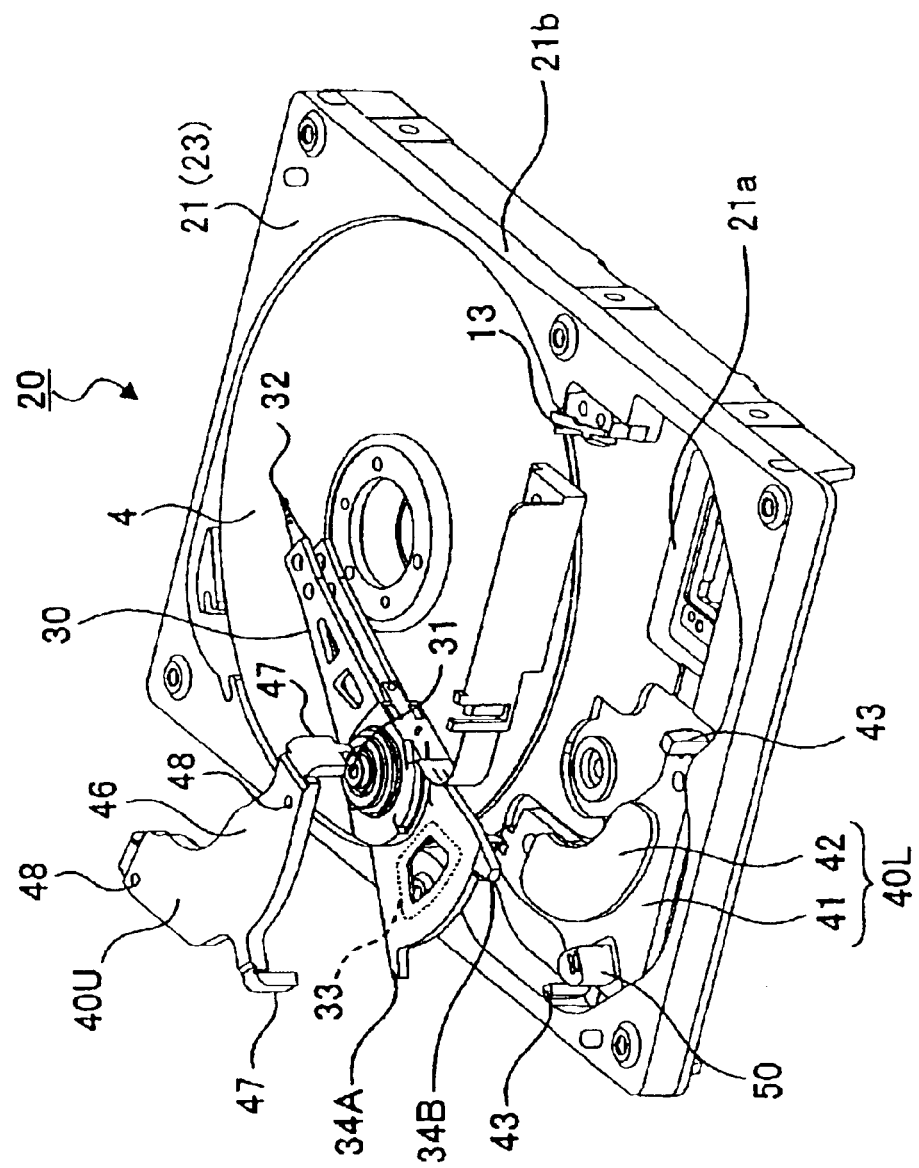
FIG. 3 is a perspective view of a hard disk drive wherein a relationship between an actuator and stopper is depicted.

As shown in FIG. 3, there is provided in base 21 a pair of stators 40L and 40U one above the other, which cooperate with voice coil 33 placed at the back end of actuator 30 to generate magnetic field therebetween, wherein voice coil 33 and stators 40L, 40U compose a voice coil motor for turning actuator 30. With this configuration, actuator 30 is turned by the voice coil motor on pivot 31 so that magnetic head 32 may seek in a radial direction of magnetic disk 4 in order to move to a given position facing opposite the target track of magnetic disk 4. In addition, for the load/unload type of disk drive unit, there is also provided in base 21 a ramp 13, which holds magnetic head 32 when it evacuates outside of magnetic disk 4.

As shown in FIG. 4(a), stator 40L comprises a plate-like yoke 41 and a plate-like magnet 42 that is provided integrally on the top surface of yoke 41. Yoke 41 is formed extending outside beyond magnet 42 and is provided with a screw hole (now shown) on the bottom surface through which a screw is inserted to secure this stator 40L to base 21, and further provided with multiple detents 43 stretching upward on the periphery in several places. In addition, there is provided in yoke 41 at a predetermined position a hole 44 for attaching stopper 50 as described below.

As shown in FIG. 3, upper stator 40U comprises, as with lower stator 40L, a plate-like yoke 46 and a plate-like magnet (not shown) that is provided integrally on the bottom surface of yoke 46. Yoke 46 is provided with multiple detents 47 stretching downward on the periphery in several places, wherein these detents 47 and detents 43 on lower stator 40L keep the spacing between upper stator 40U and lower stator 40L at a predetermined dimension. Also provided to upper yoke 46 is a screw hole 48 for inserting a tip of a screw (not shown), which is used to secure stator 40U to a cover (not shown) composing disk enclosure 23.

Base 21 composing disk enclosure 23 is approximately rectangular in plan view and comprises a bottom plate 21a forming a bottom face and a sidewall 21b stretching upward in the periphery of bottom plate 21a. Accommodated in the space surrounded by sidewall 21 on bottom plate 21a are magnetic disk 4, actuator 30, stators 40L and 40U, etc., as shown in FIG. 1, and further a cover (not shown) is attached to the top surface of sidewall 21b.

Hard disk drive 20 mentioned above has a stopper 50 for regulating the turning range of actuator 30. Stopper 50 is located between coil holding arms 34A and 34B. The tips of coil holding arms 34A, 34B protrude outside relative to voice coil 33 with respect to pivot 31 and located on the same circumference of pivot 31. On the other hand, stopper 50 is located on the same circumference as the tips of coil holding arms 34A, 34B.

Figure 5:
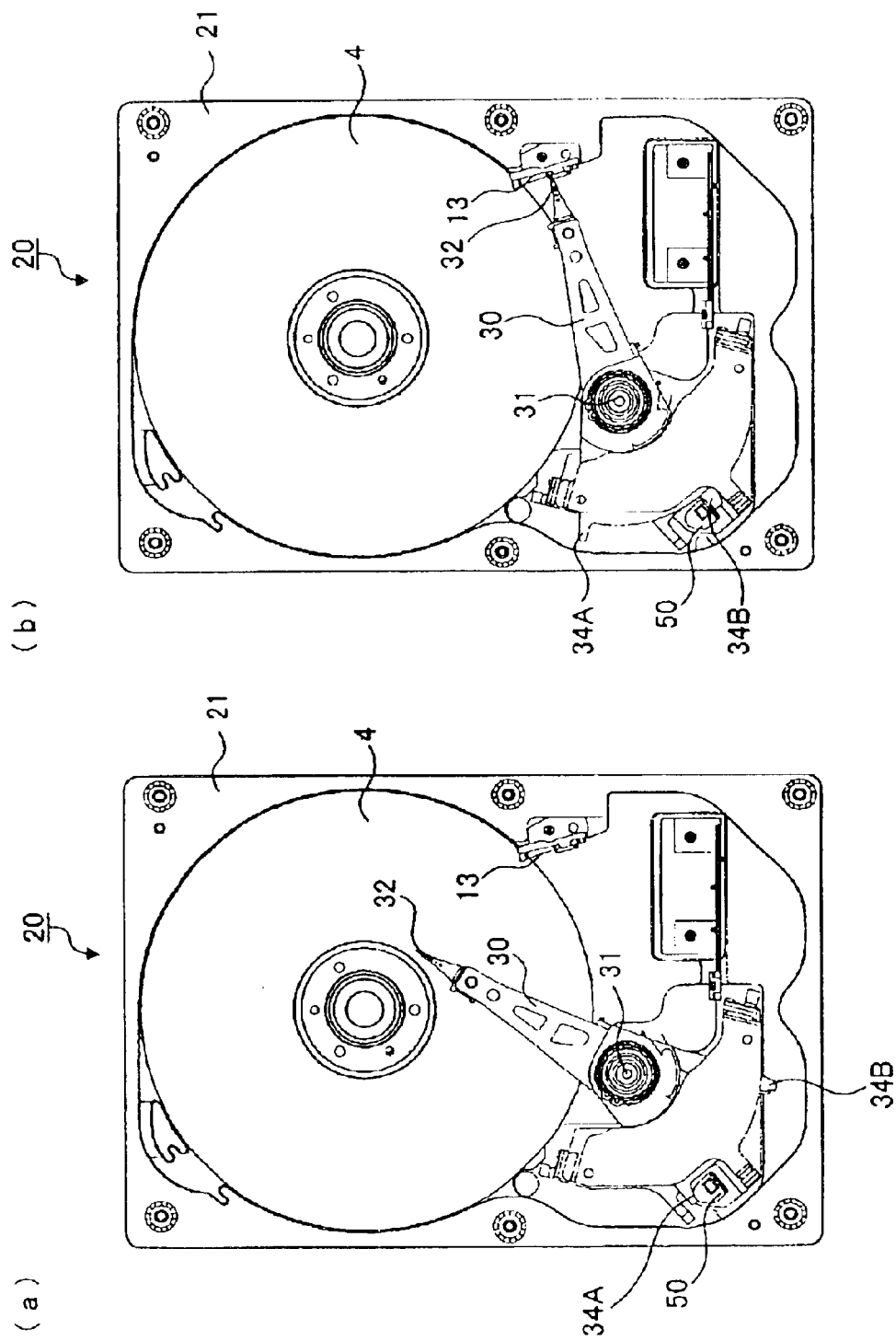

As shown in FIG. 5(a), actuator 30 is regulated of its turning range on the inside of magnetic disk 4 by one coil holding arm 34A bumping into stopper 50. Furthermore, as shown in FIG. 5(b), actuator 30 is regulated of its turning range on the outside of magnetic disk 4 by the other coil holding arm 34B bumping into stopper 50. In this way, the seek range of magnetic head 32 along magnetic disk 4 is regulated.

As shown in FIG. 4(b), stopper 50 is columnar in shape protruding upward from the top surface of lower stator 40L, wherein a stopper surface for inward regulation (hereinafter, inward stopper surface) 50A and another stopper surface for outward regulation (hereinafter, outward stopper surface) 50B are formed on the side faces of stopper 50 at a height that corresponds to the height of coil holding arms 34A, 34B of actuator 30.

Figure 7:
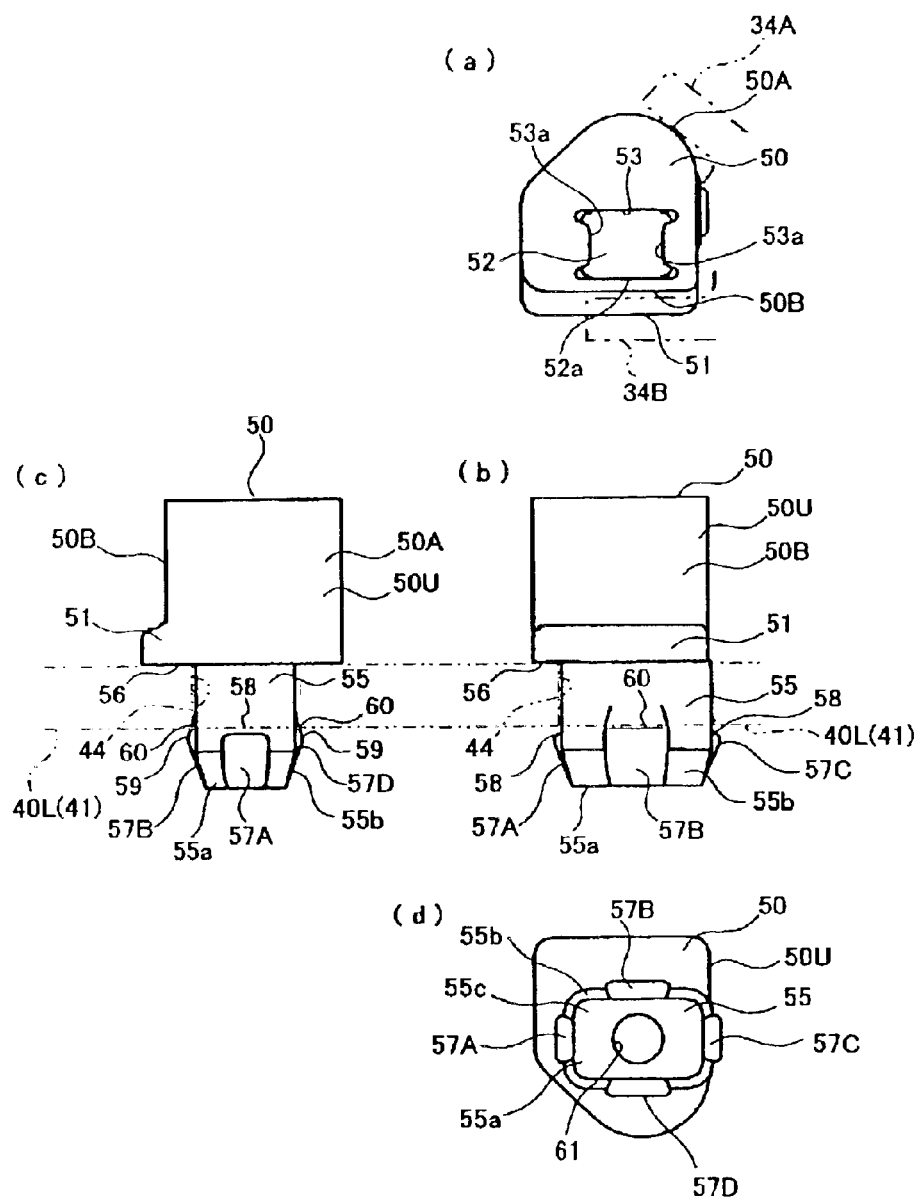
FIG. 7(a), FIG. 7(b) and FIG. 7(c) are a plan view, elevation view, lateral view and bottom view of a stopper, respectively.

As shown in FIG. 6 and FIG. 7, the inward stopper surface 50A is formed arched in shape with a certain curvature when drawn in plan view (i.e., in cross-sectional view of a plane parallel to the turning surface of actuator 30). Thus, the inward stopper surface 50A comes in contact with coil holding arm 34A of actuator 30 in a point or line. The outward stopper surface 50B is formed in a plane surface, so that it comes in contact with coil holding arm 34B of actuator 30 in a plane. There is formed an overhang 51 overhanging laterally at the bottom of the outward stopper surface 50B.

Furthermore, there is embedded in stopper 50 a magnet (fixing member or absorption member) 52 for maintaining a condition where coil holding arm 34B of actuator 30 comes in contact with stopper 50. Namely, on the top surface of stopper 50 is formed a concave recess, in which magnet 52 is embedded. A pair of pawls 53a is formed in concave recess 53 protruding inside, which prevent magnet 52 from dropping out of concave recess 53.

As shown in FIG. 7(a), magnet 52 is rectangular in plan view and mounted such that an absorption surface 52a of coil holding arm 34B is parallel with the outward stopper surface 50B of stopper 50. In order that the absorptivity of magnet 52 is effectively exerted for coil holding arm 34B, it is desirable that magnet 52 is arranged as close to the outward stopper surface 50B as possible, that is, the sidewall of the outward stopper surface 50B of stopper 50 is made as thin as possible. Moreover, as shown in FIG. 2, there is provided a piece of iron 35 on the coil holding arm 34B of actuator 30 that is absorbed by magnet 52, wherein the piece of iron 35 is attached in a position corresponding to the outward stopper surface 50B of stopper 50.

Figure 4:
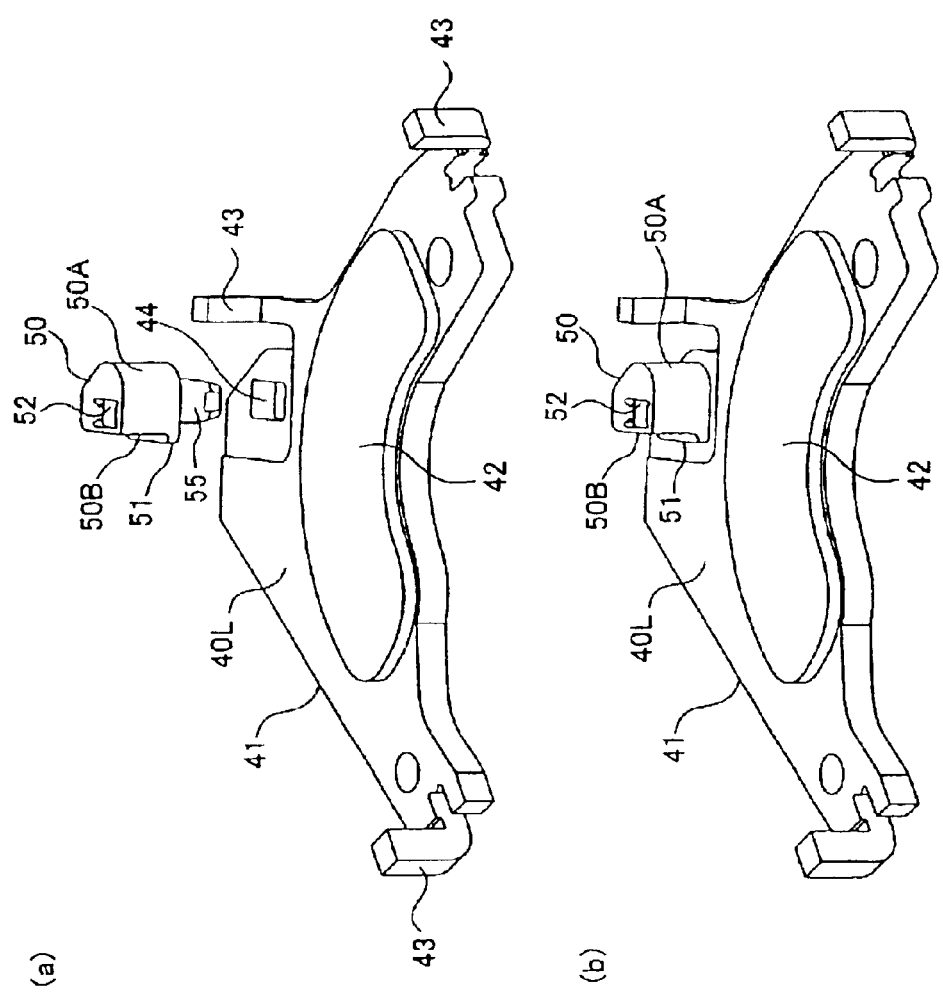
FIG. 4 is a diagram illustrating an assembly arrangement of a stopper to a stator.

As shown in FIG. 4, the aforementioned stopper 50 is secured to lower stator 40L. A hole 44 is formed in lower stator 40L, in which stopper 50 is inserted. Thus, stopper 50 comprises an insertion feature (i.e., fixing feature) protruding downward from an upper portion 50U (i.e., contact feature or stopper portion), in which the inward stopper surface 50A and outward stopper surface 50B are formed. The insertion feature 55 is rectangular in plan view, whose cross-sectional area is smaller than that of upper portion 50U, whereby a shoulder portion is formed between insertion feature 55 and upper portion 50U.

As shown in FIG. 7, insertion feature 55 is formed such that a protrusion dimension from shoulder portion 56 is greater than the thickness of yoke 41 of stator 40L. Thus, when inserting insertion feature 55 into hole 44 in stator 40L, the insertion is regulated by shoulder portion 56, resulting in the tip 55a of insertion feature 55 protruding below stator 40L. A chamfer (i.e., taper) 55b is formed at the tip 55a of insertion feature 55, whose cross-sectional area gradually becomes small with approaching tip 55a. This allows insertion feature 55 to be easily inserted into hole 44 of stator 40L.

There are formed protrusions (i.e., features for preventing from falling out) 57A, 57B, 57C and 57D protruding outside on four side faces of insertion feature 55, which is rectangular in cross-sectional view. Protrusions 57A and 57C formed on the opposite two side faces have locking surfaces 58 at positions kept away from shoulder portion 56 by a distance that is approximately the thickness of yoke 41, wherein locking surfaces 58 are approximately normal to the side faces of insertion feature 55. Accordingly, locking surfaces 58 is located on the bottom side of yoke 41 after insertion feature 55 is inserted into hole 44 of stator 40L, thus protrusions 57A, 57C serve to prevent insertion feature 55 from falling out of hole 44. Other protrusions 57B, 57D formed on the remaining two side faces of insertion feature 55 have tops 59 at positions kept away from shoulder portion 56 by a distance that is approximately the thickness of yoke 41 or somewhat greater, wherein the slopes 60 are formed from the tops 59 toward the side faces of insertion feature 55. Accordingly, tops 59 are located on the bottom side of yoke 41 after insertion feature 55 is inserted into hole 44 of stator 40L, thus slopes 60 exert pressure on insertion feature 55 to pull yoke 41 to shoulder portion 56. It should be noted that protrusions 57A, 57B, 57C and 57D need not be formed across the entire width of the side faces of insertion feature 55 but may be formed with a minimum width to exert required functions.

In addition, as shown in FIG. 7(d), a concave recess 61 is formed with a predetermined depth in the end surface 55c of insertion feature 55. Concave recess 61 allows protrusions 57A, 57B, 57C and 57D overhanging laterally to transform inside when inserting insertion feature 55 into hole 44. As a result, it becomes easy to insert insertion feature 55 into hole 44.

For such a structure, stopper 50 is secured to lower stator 40L by insertion feature 55 being inserted into hole 44. When actuator 30 turns around, coil holding arm 34A, 34B bump into upper portion 50U of stopper 50 from the side, which causes a force that acts to pull insertion feature 55 out of hole 44. Protrusions 57A, 57B, 57C and 57D formed on insertion feature 55 counter this force and prevent stopper 50 from pulling out of hole 44.

As for upper portion 50U of stopper 50, the inward stopper surface 50A which meets coil holding arm 34A overhangs outside, while the outward stopper surface 50B that meets the opposite coil holding arm 34B is formed with a thin thickness. Accordingly, when coil holding arm 34A meets the inward stopper surface 50A, bearing power is enhanced by overhang 51, which is formed at the lower end of upper portion 50U of stopper 50 and overhangs laterally from the outward stopper surface 50B.

With the aforementioned structure, the inward and outward turning of actuator 30 is regulated by stopper 50 arranged between coil holding arms 34A and 34B of actuator 30, wherein magnetic head 32 on actuator 30 is held on ramp 13 by magnet 52 embedded in stopper 50. In this manner, a single stopper 50 takes on three functions, which allows the attachment work of stopper 50 to be completed on the first try and improves working efficiencies by reducing the number of parts, thus resulting in improvement of production efficiencies and cost reductions for hard disk drive 20. Space savings are also achieved.

Since upper portion 50U of stopper 50 comprises the inward stopper surface 50A on one side and the outward stopper surface 50B on the other side, a very simple feature and structure are brought out, which also greatly contributes to cost reductions. Furthermore, the outward stopper 50B is composed by a thin-walled plane, thus a magnetic force of magnet 52 effectively acts on actuator 30, whereby actuator 30 is to be reliably held. On the other hand, the inward stopper surface 50A of stopper 50 has a curbed surface protruding outside, thus leading to a thick wall, which provides a great impact absorbency when actuator 30 bumps with stopper 50.

In addition, stopper 50 is secured to lower stator 40L by inserting insertion feature 55 into hole 44 formed in lower stator 40L. Therefore, hole 44 need only be formed in lower stator 40L by press working. It is often the case that lower stator 40L is made by press working, therefore, hole 44 need only be formed upon formation of stator 40L without additional processes. Besides, when it comes to press working, positioning accuracy required for stopper 50 could be ensured. For these reasons, cost reductions are achieved in terms of attachment and positioning of stopper 50.

In the above embodiment, stopper 50 is attached to lower stator 40L, although it may be attached directly to base 21. Moreover, coil holding arms 34A, 34B of actuator 30 are made of PPS in the above embodiment, although they may be made of other materials. Furthermore, coil holding arms 34A, 34B are configured to bump into stopper 50, however, actuator 30 may have protrusions which bump with stopper 50 in addition to coil holding arms 34A, 34B. Finally, a load/unload type of hard disk drive 20 is taken as an example in the above embodiment, however, it should be construed that the present invention is applicable to hard disk drives other than the load/unload type.

It will be understood by those skilled in the art that the embodiment described herein may be altered with various changes and modifications in form and detail as appropriate without departing from the spirit and scope of the invention.

What is claimed is:

1. A disk drive unit, comprising:
   a disk driving source for rotating a disk-like medium for storing data;
   an actuator turning on a pivotal axis and on which a head is mounted for reading and writing data to the disk-like medium;
   a chassis accommodating the disk driving source and the actuator, wherein the actuator has a pair of receiving features protruding from the pivotal axis toward an outer circumference and located on a same circumference, and wherein a stopper secured to the chassis is provided between the pair of receiving features;
   a magnet embedded in the stopper for maintaining one of the receiving features in contact with the stopper;
   a coil provided in the actuator;
   a stator secured to the chassis and cooperating with the coil to comprise a voice coil motor, wherein the stopper is secured to the stator; and wherein
   when the actuator is in contact with each of the receiving features, the magnet is positioned closer to one of the receiving features than the other one of the receiving features, respectively.

2. The hard disk drive of claim 1, further comprising a ramp for holding the head when the head evacuates from the disk-like medium, wherein the stopper includes the magnet for securing the actuator when the head is held by the ramp.

3. A head driving unit, comprising:
   a magnetic head for reading and writing data to a disk-like medium;
   an actuator for seeking the head over the disk-like medium, the actuator having an inward regulation portion for regulating inward turning of the magnetic head over the disk-like medium and contacting a stopper in a line of contact, and an outward regulation portion for regulating outward turning of the magnetic head over the disk-like medium and contacting the stopper in a plane of contact, wherein the inward regulation portion and outward regulation portion are formed integrally;
   a voice coil motor for turning the actuator on a pivotal axis and having a flat voice coil supported by the actuator and a stator placed opposite the voice coil;

the stopper for regulating a turning range of the actuator upon seeking of the head, the stopper having a magnet, and wherein the actuator has a pair of arms for supporting the voice coil, and wherein the stopper is provided to be arranged between the pair of arms; and a piece of iron on the outward regulation portion that is attracted by the magnet.

4. The head driving unit of claim 3, wherein the stopper comprises:

a fixing feature secured to the stator; and contact features which the arms come in contact with in an end of the turning range when the actuator turns.

5. The head driving unit of claim 4, wherein a hole is formed in the stator, into which the fixing feature is inserted to secure the stopper to the stator.

6. The head driving unit of claim 3, wherein the stopper comprises an absorption member for absorbing one of the arms, wherein the absorption member is arranged closer to the one contact feature, which said one of the arms comes in contact with, than the other contact feature, which another arm comes in contact with.

7. A stopper for regulating a turning range of an actuator that seeks a head over a disk-like medium composing a disk drive unit, the stopper comprising:

a columnar stopper portion having a flat contact feature that comes in contact with the actuator in a plane of contact when the actuator reaches one end of a turning range, and a rounded contact feature that comes in contact with the actuator in a line of contact when the actuator reaches another end of the turning range;

a rectangular fixing feature extending along an axis of the stopper portion for securing the stopper portion to the disk drive unit;

a magnet embedded in the stopper portion for absorbing the actuator when the actuator reaches the one end of the turning range and comes in contact with the stopper portion, the magnet being positioned closer to one portion of the actuator than another portion of the actuator, and wherein the rectangular fixing feature comprises four rectangular features protruding laterally for preventing the stopper portion from falling out of a hole, a taper that becomes gradually narrow toward its end, and a concave recess that is formed along an axis of the fixing feature.

\* \* \* \* \*